F. W. WALKER.
EDUCATIONAL CHART.
APPLICATION FILED SEPT. 5, 1917.
1,352,042.
Patented Sept. 7, 1920.
5 SHEETS—SHEET 1.
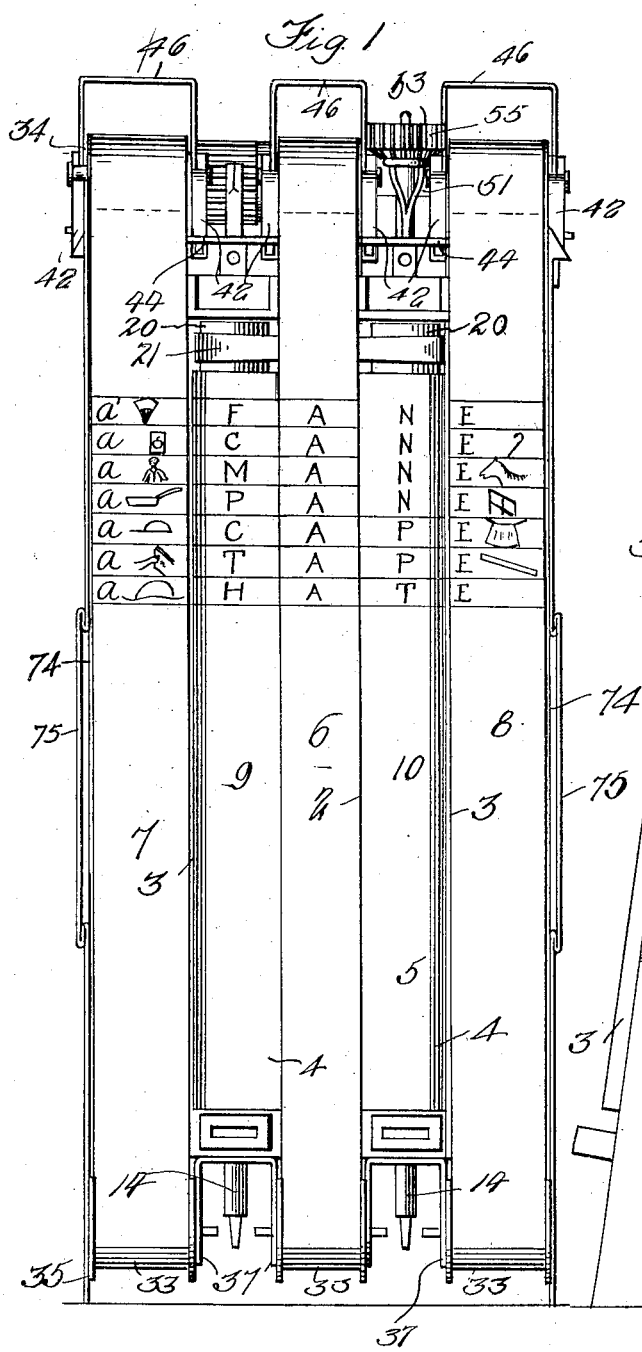
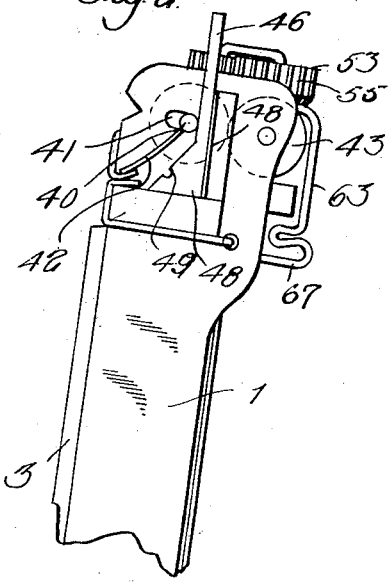
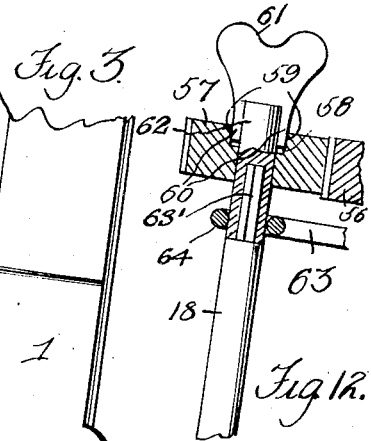
Witnesses
C. P. Hardy
H. J. Riley
Inventor
F. W. Walker
By N. Randolph Jr.
Attorney

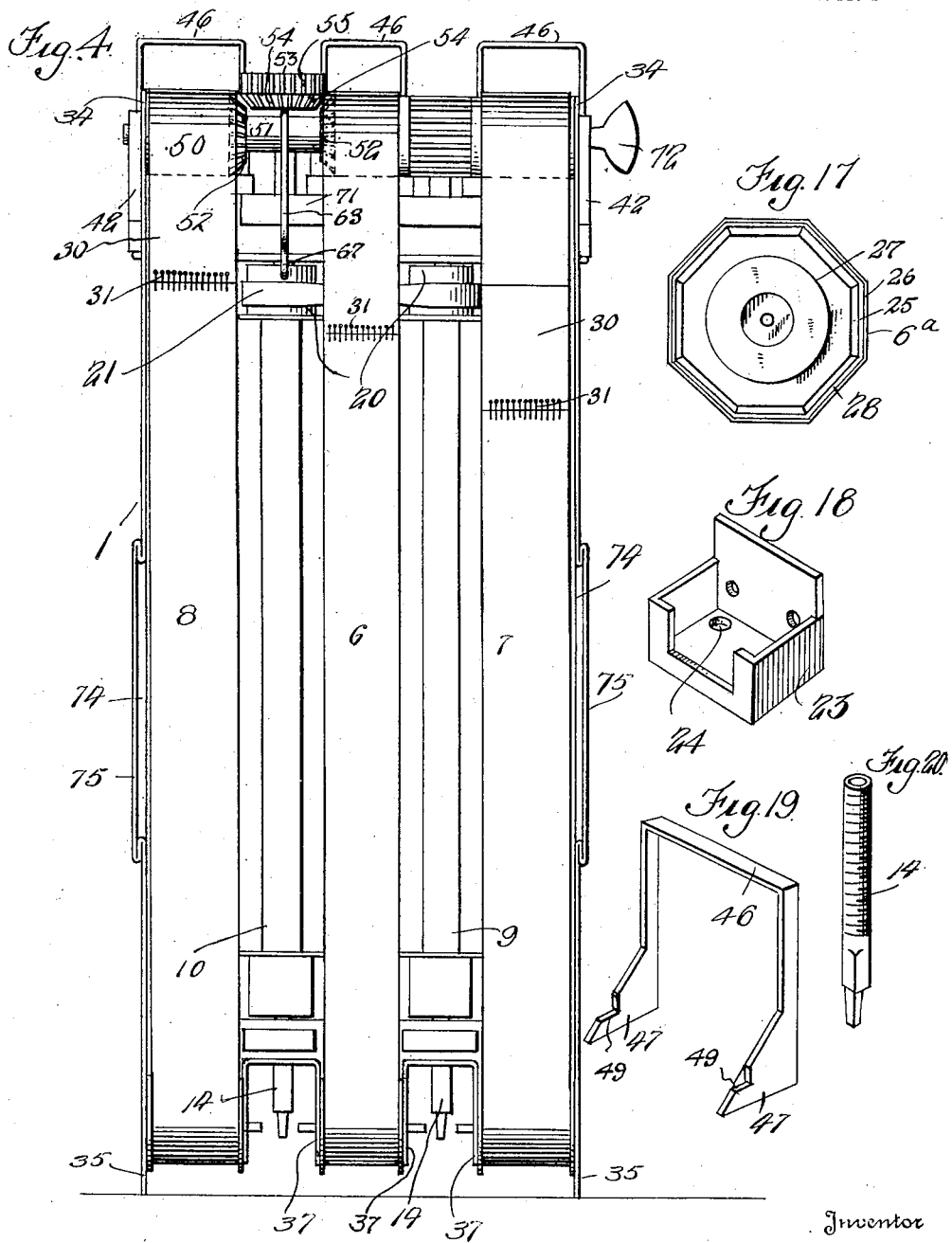

F. W. WALKER.
EDUCATIONAL CHART.
APPLICATION FILED SEPT. 5, 1917.
1,352,042.
Patented Sept. 7, 1920.
5 SHEETS—SHEET 3.
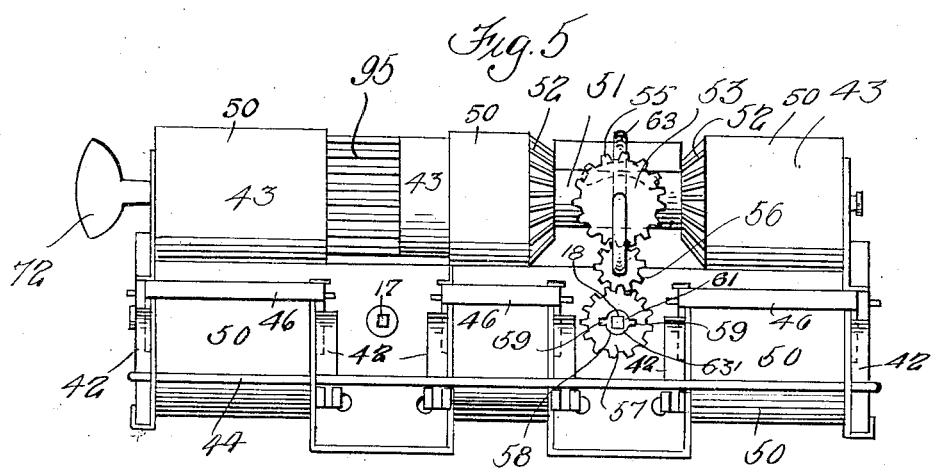
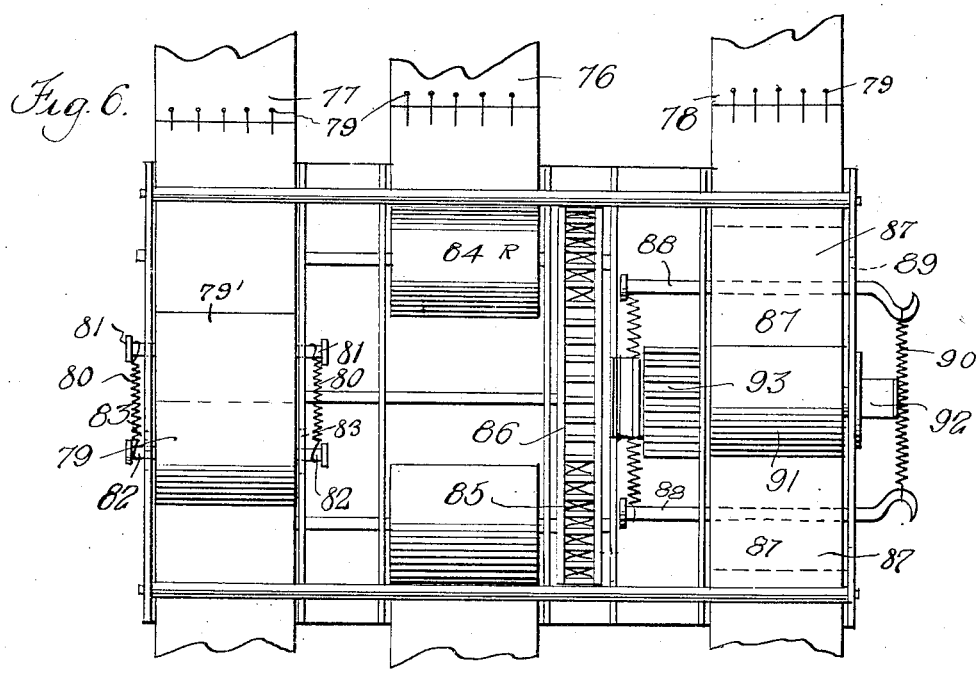

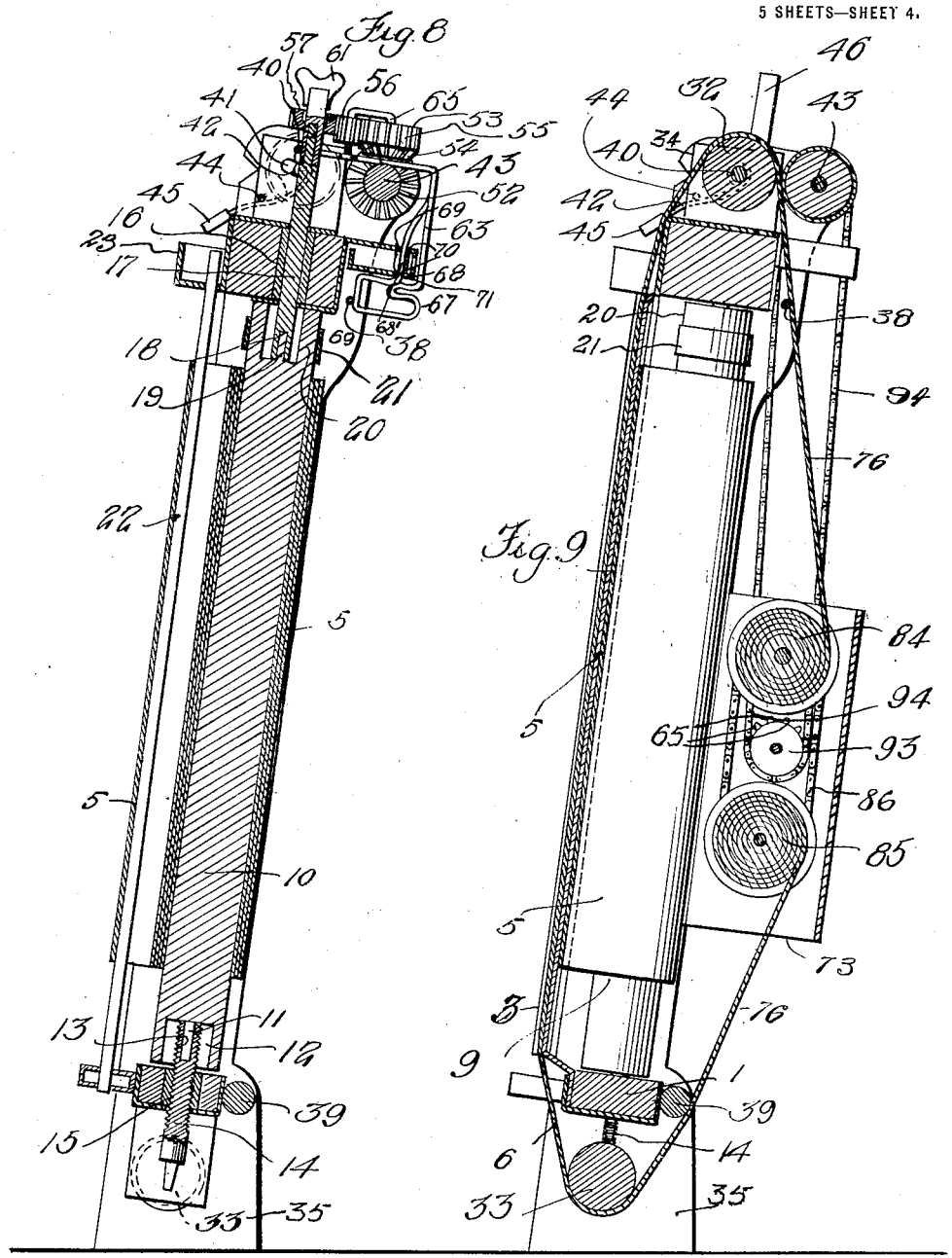

F. W. WALKER.
EDUCATIONAL CHART.
APPLICATION FILED SEPT. 5, 1917.
1,352,042.
Patented Sept. 7, 1920.
5 SHEETS—SHEET 5.
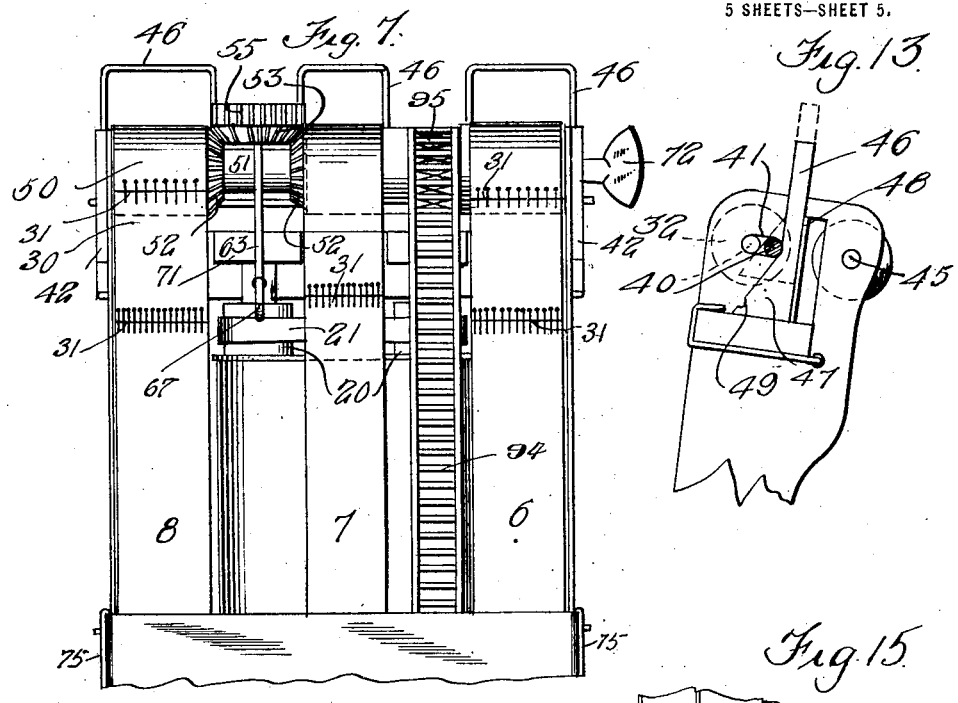
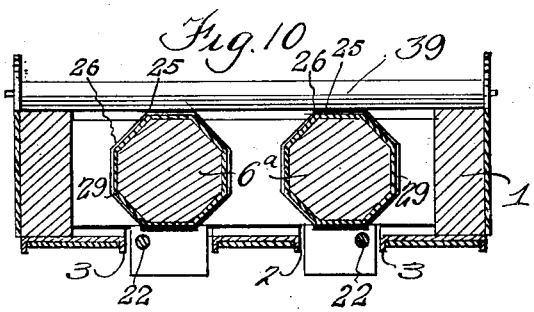
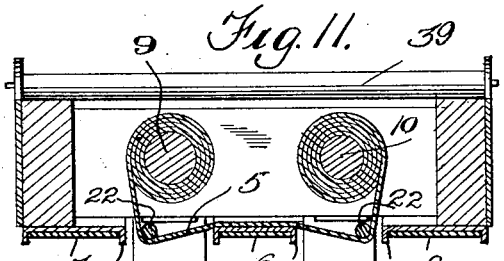
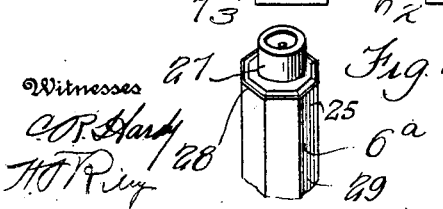

UNITED STATES PATENT OFFICE.

FRED W. WALKER, OF HULBERT, OKLAHOMA.

EDUCATIONAL CHART.

1,352,042.      Specification of Letters Patent.      Patented Sept. 7, 1920.

Application filed September 5, 1917. Serial No. 189,752.

*To all whom it may concern:*

Be it known that I, FRED W. WALKER, a citizen of the United States, residing at Hulbert, in the county of Cherokee and State of Oklahoma, have invented certain new and useful Improvements in Educational Charts; and I do hereby declare the following to be a full, clear, and exact description of the invention, such as will enable others skilled in the art to which it appertains to make and use the same.

This invention relates to an educational chart.

The object of the present invention is to improve the construction of educational charts and to provide a simple, practical and efficient educational chart of strong, durable and comparatively inexpensive construction adapted to effect a speedy acquisition of the elementary work in spelling, reading, arithmetic, language, history, geography and various other subjects, and capable of developing the ingenuity, originality, and constructiveness of the minds of the pupils and of eliminating bad habits such as scanning, repetition, stammering, lethargy, absent-mindedness and the like, with which teachers have so often to contend.

It is also an object of the invention to provide an educational chart of this character by which reading may be taught by the phonetic, word or the sentence method, and spelling and other subjects taught objectively, making the chart at once a constructor, analyzer, a deducer and an amuser.

It is also an object of the invention to provide a chart for educational purposes equipped with rotary black-boards adapted to have various positions of their areas presented to view, and capable of enabling the ingenuity of a teacher to be brought into play for the advancement of his pupils in various ways in connection with numerous subjects.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Figure 1 is a front elevation of an educational chart constructed in accordance with this invention.

Fig. 2 is a partial side elevation showing the top of the chart.

Fig. 3 is a similar view of the lower portion of the chart.

Fig. 4 is a rear elevation of the chart.

Fig. 5 is a plan view of the same.

Fig. 6 is a plan view of the auxiliary chart mechanism.

Fig. 7 is a partial rear elevation of the educational chart with the auxiliary chart mechanism attached.

Fig. 8 is a longitudinal sectional view through the educational chart, the auxiliary chart mechanism being omitted.

Fig. 9 is a similar view taken at a different point with the auxiliary chart mechanism applied.

Fig. 10 is a transverse sectional view through the chart with the polygonal rolls in position.

Fig. 11 is a similar view through the chart with the chart sheet and the auxiliary chart mechanism in position.

Fig. 12 is an enlarged sectional view of the operating mechanism.

Fig. 13 is a detail view illustrating the construction for throwing the chart belts out of operation.

Fig. 14 is a detail view of a portion of the chart sheet.

Figs. 15, 16 and 17 are detail views illustrating the construction of the polygonal rolls.

Fig. 18 is a detail view of one of the supports.

Fig. 19 is a detail view of one of the devices for throwing the belt charts out of operation.

Fig. 20 is a detail view of one of the adjustable bearing screws.

Like numerals of reference designate corresponding parts in the several figures of the drawings.

In the accompanying drawings, in which is illustrated the preferred embodiment of the invention, 1 designates an oblong supporting frame designed to be constructed of wood or other suitable material and equipped at the front with central and side longitudinal guides 2 and 3 constructed of sheet metal or other suitable material and spaced apart to provide longitudinal openings 4 for displaying a chart sheet 5 or polygonal rolls 6ª and provided with longitudinal side flanges to form guides for adjustable chart belts 6, 7 and 8.

The chart sheet 5 is mounted on longitudinal rollers 9 and 10 which are mounted in the oblong frame at the openings 4 so as to expose the chart sheet thereat, and the said chart sheet is adapted to be wound upon one of the rollers and unwound from the other roller to expose it at the said openings. The roller 9 is provided at each end and the roller 10 at its lower end with a journal 11 located in a bore or opening 12 of the roller so as not to project beyond the end of the same and fitting in a bearing 13 of an adjusting screw 14 which is mounted in a threaded opening of a nut 15 which is secured in the oblong frame. The nuts 15 are mounted in the end bars of the oblong frame, which is also provided at the top with a bearing opening 16 for the reception of a shaft or spindle 17 having in its inner end a squared socket 18 which receives a squared projection 19 located in the upper end of the roller 10 and adapted to be actuated by the means hereinafter described for rotating the said roller 10. The rollers 9 and 10 have upper cylindrical ends 20 for the reception of an elastic belt 21 which is adapted to cause the rollers to rotate in unison for winding the belt on one of the rollers and unwinding it from the other roller. The chart is comparatively short and relatively thin so that there will not be material change in the diameter of the rollers in reeling the chart from one to the other and the elastic connecting belt 21 is adapted to yield so as to permit the rollers to rotate a proper distance to unwind the chart from one and wind it on the other.

The exposed portions of the chart sheet are supported by longitudinal rollers or rods 22 arranged in pairs and located at opposite sides of the longitudinal openings 4 and mounted at their ends in apertures 24 of supports 23 which may be provided with a plurality of the said apertures 24 to permit an adjustment of the rods or rollers 22. The supports 23 (see Fig. 18), which are arranged in pairs at the top and bottom of the frame, are constructed of sheet metal or other suitable material and they are mounted on the end bars at the said spaces 4. The longitudinal rollers or rods 22 are adapted to stretch the chart sheet across the spaces 4 in substantially the plane of the belts traveling in or movable along the central and side guides. A single belt 21, as described above, is shown at the top of the chart for connecting the longitudinal rollers, but an elastic belt may be arranged at each end of the rollers as will be readily understood. Any other suitable means may be employed for causing the longitudinal rollers to rotate in unison.

Instead of employing a chart sheet, the polygonal rollers 6ª may be used and they are mounted in the same manner as the longitudinal rollers 9 and 10 and are adapted to receive sleeves 25 removably fitted on the polygonal rollers and conforming to the configuration of the same and adapted to be changed to change the subject-matter of the polygonal rollers. The polygonal rollers are provided at their lower ends with flanges 26 and their upper ends adjacent to the exterior journal portions 27 are beveled at 28 to enable the sleeves 25 to be readily placed on the polygonal rollers 6ª. The flanges 26 form stops for limiting the movement of the sleeves 25 and enable them to be accurately positioned on the polygonal rollers. The polygonal rollers are provided with a covering 29 of slate colored material, such as oil cloth or the like adapted to form blackboards to enable various matter to be displayed and readily changed as required or desired. The central and side chart strips or belts 6, 7 and 8 are preferably provided with elastic sections or portions 30 having fastenings 31, such as hooks and eyes, for enabling them to be readily detached and removed and replaced on the device so that various sets of chart belts may be employed. The chart belts pass around upper and lower rollers 32 and 33, which are journaled in suitable bearings or supports formed by upper and lower side plates or members 34 and 35 and upper and lower brackets 36 and 37 constructed of sheet metal or other suitable material and mounted upon the frame. The frame is also equipped with an upper transverse rod 38 and a lower transverse roller 39 preferably mounted in the upper and lower supports and adapted to assist in guiding the belts 6, 7 and 8. The upper rod or roller is of less diameter than the lower roller, but they may be constructed and mounted in any other desired manner, as will be readily understood.

The upper rollers 32 are provided with journals 40 operating in slots 41 of the supports and the brackets and engaged by springs 42 which yieldably maintain the upper chart belt receiving rollers in engagement with a transverse driving roller 43 which is adapted to transmit motion to one or more of the upper rollers and the chart belts. The springs 42 extend beneath a transverse rod 44 and are arranged at an inclination and have their front ends mounted in flanged casings 45 formed integral with the supports and the brackets and constituting holders for the springs 42 and arranged at the lower ends thereof. The springs extend upwardly and rearwardly and their upper ends engage the journals 40 of the upper chart receiving rollers.

The journals are movable in the said slots to connect the chart belts with and disconnect them from the transverse driving roller by slidable yokes 46 composed of parallel sides and a transverse connecting portion and having the said sides enlarged and tapered to form wedges 47 (see Fig. 19) adapted to be interposed between the journals 40 and longitudinal flanges 48 which form guides for the slidable yokes. The tapered or enlarged portions 47 are provided adjacent to their inner ends with notches 49 forming shoulders for engaging the journals to limit the outward pull or movement of the yokes. The yokes are adapted to be grasped by the transverse connecting portions which form convenient handles for operating the yokes. By this construction one, two or three of the belts may be connected with the said driving roller. While three belts are illustrated in the accompanying drawings, it will be readily understood that an educational chart of this character may be constructed with any desired number of chart belts.

The transverse driving roller is provided with chart belt engaging portions 50 having friction surfaces of any suitable material adapted to insure a positive rotation of the upper belt receiving rollers and a positive and uniform movement of the chart belts. The transverse driving roller is provided with a reduced portion 51 and it has bevel-gear teeth 52 at the ends of the reduced portion 51 to form bevel-gears for meshing with a gear 53 having bevel teeth 54 and spur teeth 55 and adapted to be shifted to engage either of the bevel-gears 52 for driving the transverse roller in either direction. The gear wheel 53 meshes with a pinion 56, which also meshes with a gear wheel 57 mounted on the shaft or spindle 17 and provided at its central opening 58 with opposite notches 59 adapted to be engaged by opposite flanges or projecting portions 60 of an operating device 61 having a tubular portion or barrel 62 which is fitted on a squared portion 63 of the shaft or spindle 17. The tubular portion or barrel 62 extends through the opening 58 of the gear 57 and the operating device 61 is adapted to be moved inwardly and outwardly to engage its projections or flanges 60 with the notches 59 and to disengage them therefrom. By this construction and arrangement the operating device may be employed for actuating the chart sheet or the polygonal rollers independently of the chart belts and also moving the chart belts and the chart sheet or polygonal rollers simultaneously. The gear 53 and the pinion 56 are mounted on a shifting lever 63 fulcrumed at 64 and having pivotal spindle portions 65 and 66, on which the gear 53 and pinion 56 are mounted. The lever, which is adapted to be operated to swing the gear 53, is provided with a handle 67 having an engaging portion 68 and consisting of a resilient loop adapted to permit the portion 68 to be engaged with central and side portions 69 and 70 of a keeper 71. The keeper 71, which is mounted on and extends rearwardly from the supporting frame at the top thereof, is constructed of sheet metal or other suitable material and it is slotted to provide the central and side portions 69 and 70. The slot is V-shaped and the engaging portion 68 of the lever is adapted to be arranged at the apex or either side of the V-shaped slot. This will hold the gear 53 in a neutral position out of engagement with the bevel-gears of the driving roller or in engagement with either of the bevel-gears of the driving roller. A leaf spring 68' is positioned in the keeper and is arranged to engage the engaging portion 16 of the lever to normally hold the same in its adjusted positions. The driving roller is adapted to be operated independently of the chart belt by means of a suitable operating device 72 located at one end of the driving roller, and when the said gear 53 is in a neutral position the driving roller may be operated to actuate one or more of the chart belts.

The chart belts and the chart sheets are arranged in sets and are adapted to be readily changed by disconnecting the fastening means of the belts and by loosening the mountings of the longitudinal rollers of the chart sheets and the polygonal rollers are changed and replaced in a similar manner. The educational chart is also equipped with auxiliary chart belt mechanism, which is used in lieu of the belts 6, 7 and 8 and this mechanism comprising a support or bracket 73 of approximately U-shape constructed of sheet metal or other suitable material and composed of spaced sides and a transverse connecting portion and having its sides mounted in openings 74 of the supporting frame. The openings 74, which are located at opposite sides of the supporting frame, are preferably formed by separate plates or pieces 75 secured at their terminals to the supporting frame and arranged in spaced relation with the same. By this construction the supplemental bracket or support may be readily applied to and removed from the main frame. The auxiliary chart belt mechanism is equipped with central and side belts 76, 77 and 78 mounted on rollers and having suitable fastening means 79, consisting of hooks and eyes or other suitable fastening devices and adapted to enable the belts to be readily passed around the upper and lower rollers of the main frame and arranged in the longitudinal guides thereof when it is desired to use the same. The belts of the auxiliary mechanism are operated in the same manner as the central and side belts 6, 7 and 8. The rollers 79, of the belt 77, are yieldably maintained in engagement with each other to cause a positive movement of them in opposite directions by means of a spring 80 located at each side of the belt 77 and connected at one end with the adjacent journal 81 of one of the rollers 79' and at the opposite end with the adjacent journal 82 of the other roller 79'. The journals 82 operate in slots or openings 83 and the springs 80 pull the rollers 79' into frictional engagement and cause the belt 77 to unwind from one of the rollers 79' and rewind on the other roller 79' when the said belt 77 is actuated by the mechanism of the main frame.

The rollers 84 of the belt 76 are provided with sprocket pinions 85 which mesh with a chain 86, whereby the pinions are simultaneously rotated for causing the belt 76 to unwind from one of the rollers 84 and rewind on the other roller.

The belt 78 is connected with rollers 87 mounted on shafts 88 operating in slots 89 and connected by springs 90 which maintain the rollers 87 in frictional engagement with an intermediate or centrally arranged roller 91 having a friction surface and mounted on a shaft 92 which carries a sprocket wheel 93, and the latter meshes with a sprocket chain 94 which passes around the driving roller. The driving roller is provided with sprocket teeth 95 adapted to engage the chain 94 for positively driving the intermediate roller 91.

The lower supports 35 of the main frame are enlarged, as shown, to form a base or supporting legs for maintaining the stand in an upright position, the chart being preferably disposed at a slight inclination, as shown. The chart belts and the chart sheets are arranged to coöperate in displaying the matter designed to be shown to the pupils for assisting them in understanding the various subjects. In Fig. 1 of the drawings, the chart is arranged to illustrate spelling and pronunciation and to set forth the addition of a vowel to a syllable and the changing of the vowel of the syllable from a short to a long sound. The belt chart 7 contains and displays the vowel A and on the same line the picture of a fan and the letters F A N occur opposite the picture of the fan on the chart sheet and the chart belt 6, the chart belt 6 bearing the vowel A of the word FAN, and the chart sheet having the consonants F and N arranged in spaced relation, as shown. The belt chart 8 bears the vowel E which occurs in line with the word FAN making the same FANE and changing the vowel A of the same from short to long. The next line of the chart bears the vowel A and the representation of a can and the letters C A N appear on the chart sheet and the chart belt 6, while the chart belt 8 bears the letter E, changing the word CAN to CANE. The next illustration is the word MAN which is changed into MANE and this is followed by the words PAN, TAP, CAP and HAT, which are changed into PANE, TAPE, CAPE and HATE. The chart strip is also designed to bear pictorial representations of the second word, or the word with the vowel A having the long sound. This will serve to show the coöperative relation of the belts and the chart sheets in the above illustrations.

In Fig. 14 a portion of the chart sheet used in connection with the longitudinal rolls 9 and 10 is shown bearing words containing the same letters or similar letters arranged differently to spell the different words and adapted to be successively presented to view through the openings 4 for concentration of the attention of the pupils on the chart in order to distinguish the different words and this will, to a great degree, prevent absent-mindedness, lethargy and similar bad habits with which teachers often have to contend. It is to be understood, however, that any subject or group of words arranged in any order may be arranged on the chart sheet, as may be desired.

What is claimed is:

1. An educational chart including a frame having longitudinal guides arranged in spaced relation, chart belts carried by the frame and movable along the guides, longitudinal rollers mounted in the frame at the spaces between the guides and adapted for carrying charts and for exposing the same at the said spaces to coöperate with the chart belts, and means connected with the rollers and with the chart belts for moving the same simultaneously and independently.

2. An educational chart of the class described including a frame provided with spaced rollers arranged in sets, chart belts mounted on the rollers, and a transverse driving roller frictionally engaging the belts opposite one set of the said rollers for advancing the same.

3. An educational chart of the class described including a frame, rollers mounted on the frame at the ends of the chart, belt charts arranged on the rollers, and a transverse driving roller mounted on the frame and engaging the belt charts at one end of the device and adapted to move the belts simultaneously in either direction, and means for moving the belts out of engagement with the driving roller.

4. An educational chart of the class described including a frame, rollers mounted on the frame at the ends of the chart, belt charts arranged on the rollers, and a transverse driving roller mounted on the frame and engaging the belt charts at one end of the device and adapted to move the belts simultaneously in either direction, springs for urging the said rollers into engagement with the driving roller, and means for moving the said rollers out of engagement with the driving roller for enabling one or more of the belts to be actuated by the driving roller.

5. An educational chart of the class described including a frame, yieldably mounted rollers mountd in the frame, chart belts passing over the said rollers, a driving roller engaging the chart belts opposite the said rollers, and means including a yoke having wedge shaped portions for moving the yieldably mounted rollers with respect to the driving roller to enable one or more of the chart belts to be actuated.

6. An educational chart of the class described including a main frame having spaced portions provided with slots, said spaced portions being also provided with guide flanges, rollers having journals mounted in the said slots, a driving roller coacting with the said rollers, means for engaging the said journals for urging the rollers thereof into frictional engagement with the driving roller, and means including a slidable wedge movable along the said flanges and arranged to be interposed between the same and the journals for forcing the rollers out of engagement with the driving roller.

7. An educational chart including a frame having spaced projecting portions arranged in pairs and provided with castings, rollers movably mounted in the spaced projecting portions, springs secured in the frame and engaging the rollers for urging the same in one direction, and a driving roller having portions frictionally engaging the said rollers.

8. An educational chart of the class described including a frame, transverse rollers mounted on the frame at the ends thereof, chart belts arranged on the transverse rollers and movable along the frame, a transverse driving roller having portions frictionally engaging the belt opposite the said rollers at one end of the frame, said driving roller having spaced gears, a longitudinal roller mounted in the frame and having a shaft, an operating device slidable on the shaft, a gear also arranged on the shaft, said operating device and gear having coacting means for interlocking one with the other, a shifting lever, and gears carried by the shifting lever for connecting the said gear with the gears of the driving roller.

9. An educational chart of the class described including a frame, transverse rollers mounted on the frame at the ends thereof, chart belts arranged in the transverse rollers and movable along the frame, a transverse driving roller having portions frictionally engaging the belt opposite the said rollers at one end of the frame, said driving roller having spaced gears, a longitudinal roller mounted in the frame and having a shaft, an operating device slidable on the shaft, a gear also arranged on the shaft, said operating device and gear having coacting means for interlocking one with the other, a shifting lever, gears carried by the shifting lever for connecting the said gear with the gears of the driving roller, the said shifting lever having an engaging portion, and a keeper provided with an approximately V-shaped slot receiving the engaging portion of the shifting lever and adapted to hold the same in a central position and in a position at either side thereof to maintain the gear of the lever in a neutral position or at other times in mesh with either of the gears of the driving roller.

10. An educational chart of the class described including a frame having longitudinal guides spaced apart to provide intervening openings, chart belts operating in the guides, longitudinally disposed rollers mounted in the frame at the said intervening openings, a chart carried by the said rollers, and supports extending along the said intervening openings and forming guides for the chart.

11. An educational chart of the class described including a frame having longitudinal guides spaced apart to provide intervening openings, chart belts operating in the guides, longitudinally disposed rollers mounted in the frame at the said openings, a chart carried by the said rollers, spaced longitudinal rods arranged in pairs at the openings adjacent to the guides and supporting spaced portions of the chart.

12. An educational chart of the class described including a frame having threaded openings, screws mounted in the said threaded openings and provided with bearings, rollers arranged in said frame and provided with interiorly arranged journals and exteriorly arranged journals, the interiorly arranged journals fitting in the bearings of the said screws, and a belt arranged on the exteriorly arranged journals.

13. An educational chart of the class described including a supporting frame provided at opposite sides with sockets, rollers mounted on the supporting frame at the ends thereof, a support removably fitted in the said sockets and located at the back of the frame, rollers mounted in said supporting frame, and belts arranged on the rollers and passing around the rollers of the main frame, and means for operating the belts, said belts forming movable charts.

14. An educational chart of the class described including a main frame, an auxiliary support mounted on the main frame, central and side belts provided with rollers mounted in the said support, the rollers of one of the side belts frictionally engaging each other, gearing connecting the rollers of the central belt, a frictional roller interposed between and engaging the rollers of the other side belt, and guiding means on the main frame for the said belts.

15. An educational chart of the class described including a main frame, an auxiliary support mounted on the main frame, central and side belts provided with rollers mounted in the said support, the rollers of one of the side belts frictionally engaging each other, gearing connecting the rollers of the central belt, a friction roller interposed between and engaging the rollers of the other side belt, guiding means on the main frame for the said belts, a driving roller mounted on the main frame, and gearing connecting the driving roller with the said friction roller.

In testimony whereof I affix my signature in presence of two witnesses.

FRED W. WALKER.

Witnesses:
HAL C. KING,
MACK KIRKLIN.